United States Patent [19]

Horiuchi et al.

[11] Patent Number: 5,708,768
[45] Date of Patent: Jan. 13, 1998

[54] CHARACTER GENERATION

[75] Inventors: Yuichi Horiuchi; Junichi Enomoto; Katsufumi Takagishi, all of Hitachi, Japan

[73] Assignee: Hitachi, Ltd., Tokyo, Japan

[21] Appl. No.: 890,130

[22] Filed: May 29, 1992

Related U.S. Application Data

[63] Continuation of Ser. No. 730,396, Jul. 16, 1991, abandoned, which is a continuation of Ser. No. 387,755, Aug. 2, 1989, abandoned.

[30] Foreign Application Priority Data

Aug. 5, 1988 [JP] Japan .................... 63-194415

[51] Int. Cl.$^6$ ........................................... G06F 15/00
[52] U.S. Cl. ........................................... 395/171
[58] Field of Search ........................ 395/162, 164, 395/165, 166, 150, 151, 167, 168, 171, 172, 805; 340/798, 799; 345/141, 143, 144

[56] References Cited

U.S. PATENT DOCUMENTS

| | | | |
|---|---|---|---|
| 4,954,979 | 9/1990 | Eibner | 364/900 |
| 5,150,459 | 9/1992 | Kajimoto | 395/151 |
| 5,179,647 | 1/1993 | Chang | 395/142 |
| 5,189,730 | 2/1993 | Kajimoto | 395/142 |
| 5,222,207 | 6/1993 | Yamada | 395/142 |

*Primary Examiner*—Phu K. Nguyen
*Attorney, Agent, or Firm*—Antonelli, Terry, Stout & Kraus, LLP.

[57] ABSTRACT

A character generating system drives a printer engine to print characters in response to an instruction from a host computer. The characters to be printed by the printer information are normally generated on the basis of dot data stored in a cache memory via a print map memory under the control of e.g. a microprocessor. Since the cache memory is a volatile memory, its contents may be erased due to disconnetion of the power supply. In order to speed up the regeneration of the dot data in the cache memory, information relating to the dot data is stored in a non-volatile memory, and on reconnection of the power supply, that information is used together with vector information in a vector memory for regeneration of the dot data in the cache memory.

6 Claims, 3 Drawing Sheets

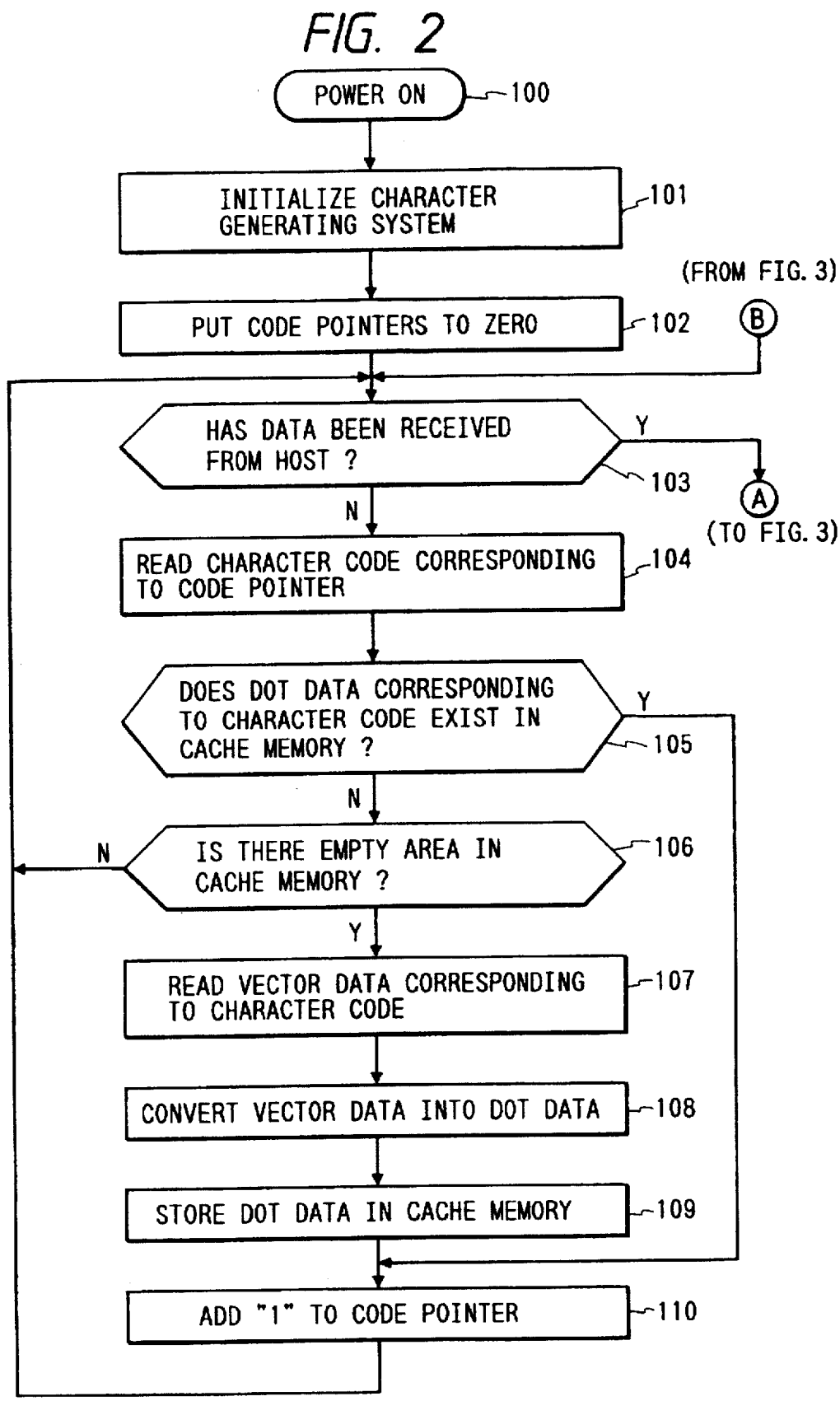

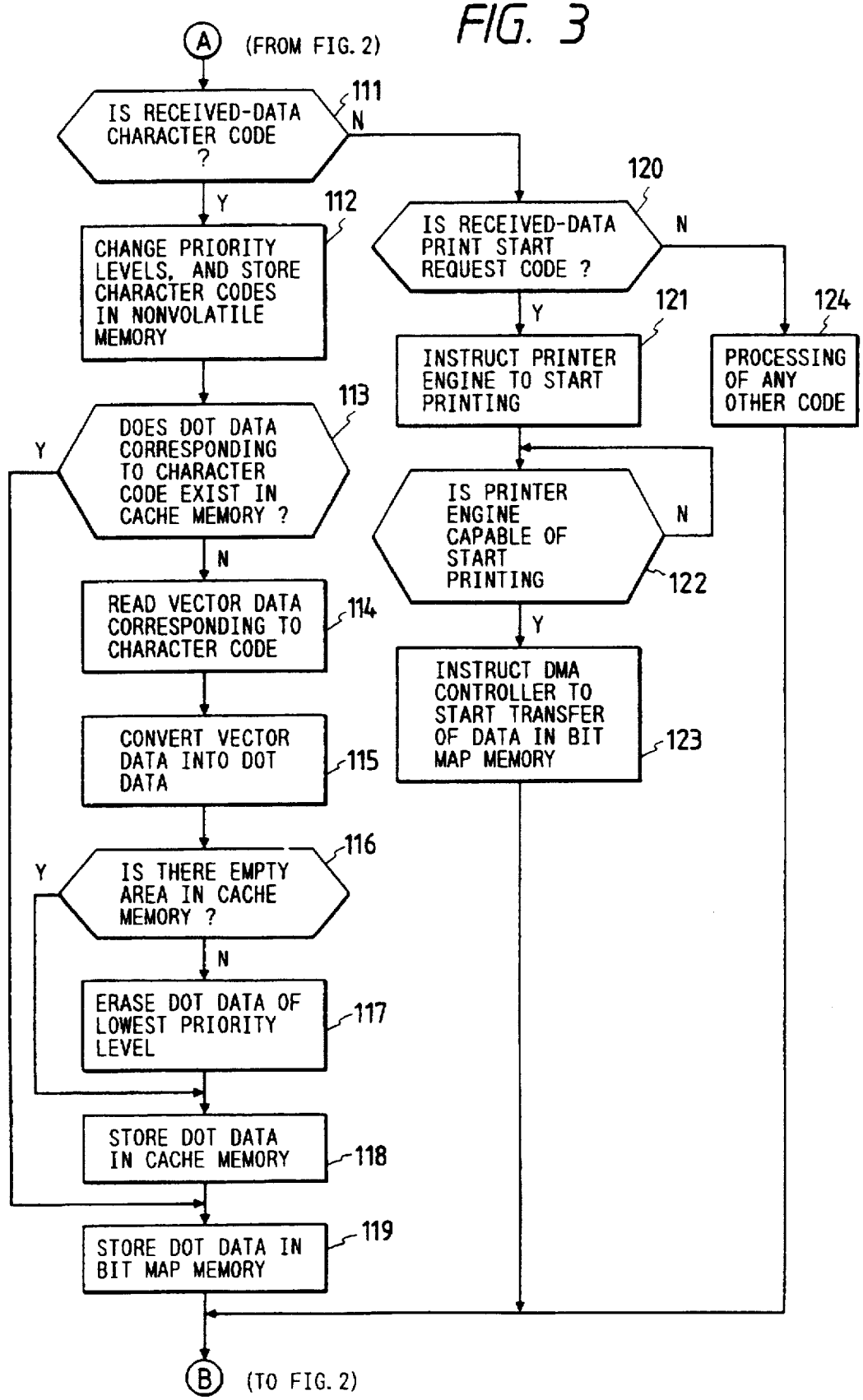

CHARACTER GENERATION

This is a continuation of application Ser. No. 07/730,396, filed Jul. 16, 1991, now abandoned, which is a continuation of U.S. application Ser. No. 07/387,755 filed on Aug. 2, 1989, now abandoned.

BACKGROUND OF THE INVENTION

Field of the Invention

The present invention relates to character generation, and particularly, but not exclusively, to character generation using a laser printer. The present invention relates both to a character generation system and to a method of generating characters.

Optical printers, such as laser printers, are now becoming increasingly common. Such printers have a printer driver or engine which causes the printer to operate on the basis of received instructions. Those instructions originate at one or more computers, such as a microcomputer, but before the computer instructions can be printed by the printer, they need to be converted from the computer-supplied information to terminals which instruct the printer engine. That conversion involves termination of the method of forming the characters, i.e. the font type.

There are two principle types of fonts, namely dot fonts which generate characters on the basis of a plurality of dots, and vector fonts which generate characters on the basis of pre-stored shapes corresponding to all of one part of the character. The latter include outline fonts and stroke fonts. Vector fonts have many advantages. Primarily, the size of the character to be printed can be changed easily, without any loss of print quality, since it is simply a matter of determining a certain magnification for the character. However, vector fonts have a disadvantage in that it takes longer to generate a character in this way, and therefore printing is slower. Characters based on dots, however, can be printed more quickly but changing the size of the character is much more difficult, unless the font effectively remembers a plurality of different sizes of character, rather than simply magnifying the character.

In order to try to achieve a compromise between these two font types, it is known to provide a character generating system in which the main memory stores character information in vector form, and whenever a character is needed, a dot font duplicate of the character is produced, and that duplicate is stored in a cache memory. The result of this is that the cache memory becomes filled with data representing characters, formed not only of a dot pattern to produce that character, but also representing a size of that character. In this way, since the cache memory will hold the most frequently used characters, much of the printing may be achieved directly from the cache memory, and the vector memory need be consulted only when it is desired to print a character which previously has not been used. Of course, once that character has been used, it it stored in the cache memory in case it is used again.

However, such a system has one significant problem, namely that the cache memory is volatile, and all the data in the cache memory is erased when the system is switched off. It is theoretically possible to use a cache memory which is not volatile, but a non-volatile memory to achieve the same function as the cache memory would have to be very large, particularly when it is recognized that the cache memory is storing not only every character, but every size of character, which is to be used. The cost of such a non-volatile memory would be prohibitive.

The result of this is that, when the system is switched off and on, the start of printing is slow because there are initially no characters in the cache memory. Thus, each character required for printing must be re-created from the information in the vector memory. Of course, this problem diminishes as the printer is used, and characters are stored in the cache memory, but the problem returns again immediately when the power is disconnected and reconnected.

Japanese patent publication number 53-41017 discloses an outline font as one type of vector font, and the use of cache memories as described above is also known.

SUMMARY OF THE INVENTION

The present invention seeks to overcome, or at least ameliorate, the problem that printing is slow when the power supply is reconnected due to the volatility of the cache memory. In its most general aspect, the present invention proposes that the character generating system have a non-volatile memory in which information relating to the data in the cache memory is stored. Then, if the cache memory becomes erased, its data can be re-established on the basis of that information, and also from using the data stored in the vector memory.

Of course, it would be possible for the non-volatile memory to contain a complete duplicate of the cache memory, i.e. the full dot data that is stored in the cache memory, but this would normally be prohibitively expensive, again because of the required memory capacity. However, the non-volatile memory needs to store only codes corresponding to the characters used, and their sizes, since that information is used in conjunction with the information in the vector memory, and so the actual dot pattern needed can be re-created directly into the cache memory. The non-volatile memory will also normally store the address of the dot data in the cache memory so that the dot data can be completely restored when the power is returned to the cache memory.

At first sight, the time gain achievable by the present invention is not large. However, it should be remembered that optical printers, such as laser printers, have a warm-up time before-they can print, and this warm-up time may be used to re-establish the contents of the cache memory.

Of course, that warm-up time may not be sufficient to allow all the dot data originally stored in the cache memory to be regenerated in that cache memory after the power has been restored. Therefore, in a development of the present invention, a priority code is associated with each character. The priority code determines the order in which the corresponding dot data is regenerated in the cache memory. For example, a simple priority system could be based on the number of times a character is used, with the most frequently used characters being regenerated first. With such an arrangement, each time a character is printed, a count is kept and the information relating to this count is stored preferably in both the cache memory and the non-volatile memory. Then, that count is used during the regeneration operation. In a further development of this, however, the priority may be based on a modified count rate, with recent counts carrying more weight, so that those characters which were used frequently just before the cache memory was erased are regenerated first, and characters which have not been used for some time, even if they had been frequently used, would be regenerated later.

This regeneration of dot data in the cache memory and the corresponding information of the non-volatile memory may also be used to resolve the problem that occurs when the cache memory becomes full. If the cache memory becomes full, dot data can be deleted from it on the basis of the priority, with data of low priority being deleted first. Then, it is necessary to delete the information in the non-volatile memory which corresponds to the dot data which has been deleted from the cache memory.

The present invention also has a further aspect. When printing a character, the system first checks to see if that character (at the right size) is present in the cache memory, and if it is, printing proceeds immediately. If not, the system checks to see if information corresponding to that character is stored in the non-volatile memory. It sometimes happens that only part of the dot data in the cache memory has been deleted, in which case the fastest way of restoring (regenerating) that data is to use the information in the non-volatile memory. In some situations, however, the dot data has to be completely regenerated from the vector data alone, but this occurs only with infrequently used characters and therefore does not seriously compromise printing speed.

Since the regeneration of dot data in the cache memory is effected on the basis of information stored in the non-volatile memory, it is possible to provide a plurality of different non-volatile memories, and to make use of the appropriate non-volatile memory depending on the sort of characters that are to be printed. This has application, for example, where the printer is to be used by different users having different character demands. Then, each user may have a non-volatile memory adapted to their own particular demands, e.g. by having a non-volatile memory in the form of a floppy disc which is inserted in the computer connected to the printer, so that each user has the characters that that user most desires to be regenerated in the cache memory most quickly.

Finally, it should be noted that, in the above description, it is assumed that the information in the non-volatile memory corresponds to the dot data which is stored in the cache memory. In fact, it would be possible for the non-volatile memory to store information relating to vector information of commonly used characters, which information is then used in conjunction with the cache memory to regenerate the dot data, but it is thought that this is less efficient.

BRIEF DESCRIPTION OF THE DRAWINGS

An embodiment of the present invention will now be described in detail, by way of example, with reference to the accopanying drawings, in which:

FIGS. 2 and 3 are flow charts illustrating the operation of the character generating system of FIG. 1.

DETAILED DESCRIPTION

Figure 1:
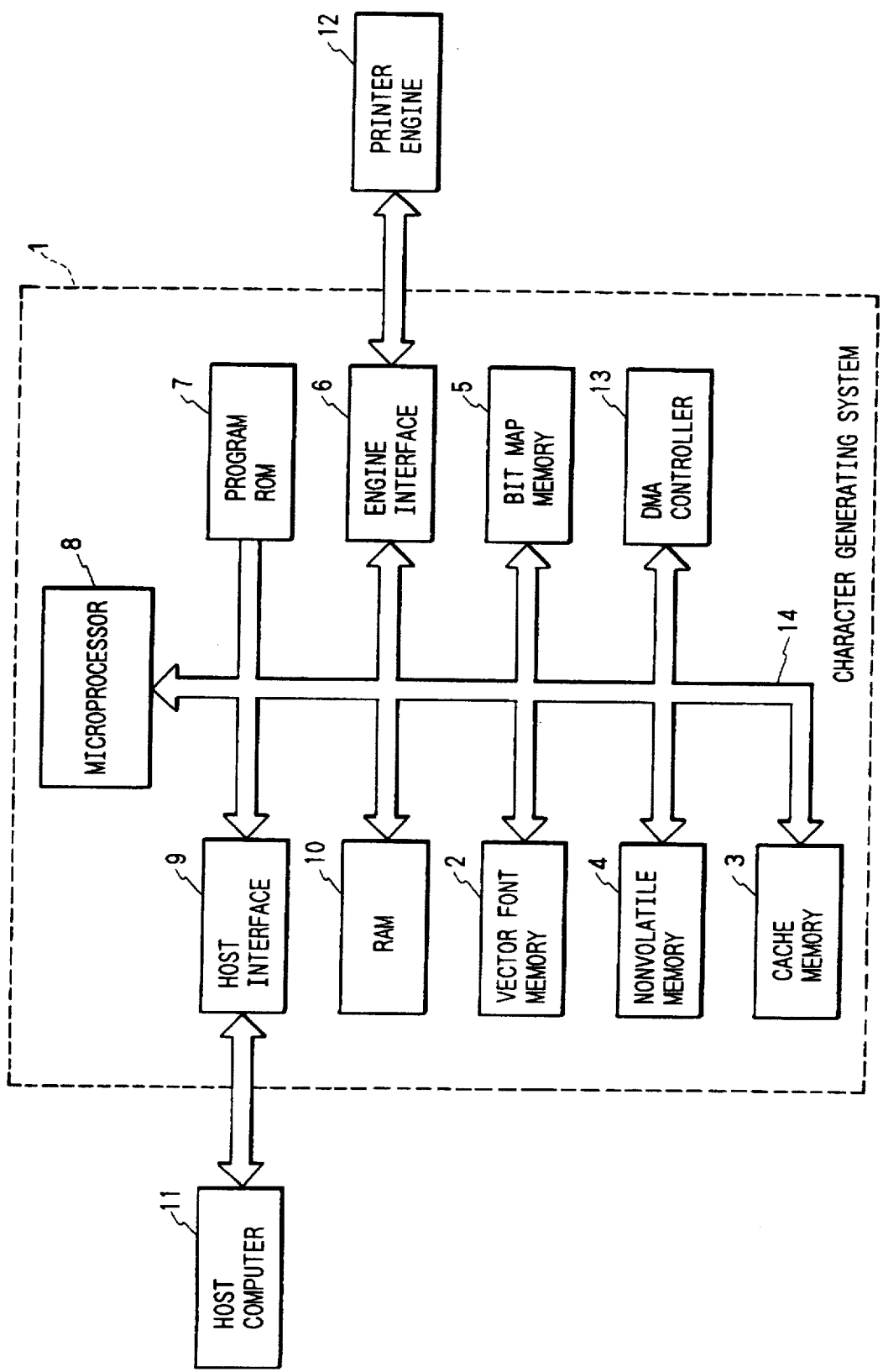
FIG. 1 is a schematic diagram of a character generating system according to the present invention.

Referring first to FIG. 1, a host computer 11 is connected to a character generating system 1, and the computer 11 transfers the character code of a character to-be-printed and a control code necessary for printing, to the character generating system 1. The character code and the control code are transferred to a bus 14 through a host interface 9, and a microprocessor 8 decodes the character code as well as the control code and performs processing in accordance with a program stored in a program ROM 7. A RAM 10 in the character generating system 1 is used for temporarily storing data required for the microprocessor 8 to perform processing. A vector font memory 2 stores vector data items indicating the shapes of the contour lines of characters to-be-printed.

A cache memory 3 stores dot data items into which the vector data items indicative of the shapes of the contour lines of the characters as stored in the vector font memory 2 are converted by the microprocessor 8 in accordance with an algorithm stored in the program ROM 7. A non-volatile memory 4 holds data even when the power source to the system is cut off. The non-volatile memory may be, e.g., a semiconductor memory having a battery connected thereto, an electrically-erasable read only memory, or a magnetic memory. In the non-volatile memory 4, character codes are stored which correspond to the dot data items of the characters stored in the cache memory 3. The "character code" is a code indicative of the character, and information items indicative of the type of the character, such as Ming type or Gothic type, the size of the character, and the modification of the character, such as italic type or bold face. If the non-volatile memory is a semiconductor memory, a large storage capacity is expensive to achieve. Therefore, only the data items of the character codes are stored without storing the dot data items of the characters. When the character code data items exist, the corresponding dot data items can be generated by the use of a program.

Furthermore, the character codes are stored in association with priority levels. The priority level is determined by the frequency of use of a printed character, or an algorithm may give a preferred weighting to a recently printed character over a less recently printed character.

A bit map memory 5 stores therein the dot data corresponding to the positions on a sheet of paper at which character dots are to-be-printed. This bit map memory is used so that the dot data of the character stored in the cache memory 3 is transferred thereto and stored therein, or that, when the print code of a pattern has been transferred from the host computer 11, data converted into dots corresponding to the pattern are stored therein. A DMA controller 13 performs the control of fetching dot data stored in the bit map memory 5, at a timing synchronous with the printing operation of a printer engine 12. An engine interface 6 is an interface for transferring the dot data delivered from the bit map memory 5 to the printer engine 12, or for giving the instruction of starting the printing from the microprocessor 8 to the printer engine 12 or receiving information indicative of the status of the printer engine 12.

Next, an embodiment will be described in conjunction with the flow charts of FIGS. 2 and 3. As illustrated in FIG. 2, when the power source is turned ON (100), the various constituents of the character generating system 1 are initialized (101). Subsequently, the values of code pointers are set to zero (102). The code pointer is a pointer which points to the code data of a character stored in the non-volatile memory 4, and the code data items of characters are stored in the order in which, as the value of the code pointer is smaller, the code data of the character of higher priority level is obtained. The next step checks to be if code data has been received from the host computer 11 (103). In the presence of the received data, it is processed according to the flow chart shown in FIG. 3.

In the absence of the received data, a character code corresponding to the code pointer stored in the non-volatile memory 4 is read (104). A check is made to see if dot data corresponding to the character code is stored in the cache memory 3 (105). When the dot data is not stored in the cache memory 3, a check is made to see if an empty area exists in the cache memory 3 (106). In the absence of an empty area, a subsequent processing is carried out to produce an empty area. If there is an empty area, vector data corresponding to the character code is read from the vector font memory 2

(107), the vector data is converted into dot data (108), the dot data is stored in the cache memory 3 (109), and "1" is added to the code pointer (110). Next, the control flow returns to the step 103.

By repeating the above processing steps, dot data items corresponding to characters printed before the cutoff of the power source are restored (regenerated) in the cache memory 3. In this case, the process of storing the dot data items in the cache memory 3 is performed in the order of higher priority levels.

A thermal fixation appliance is usually employed in a laser printer utilizing electrophotography, an LED printer, an LCD printer, or the like. The period of time needed to bring the thermal fixation appliance to its operating temperature is several tens of seconds, and the character generating system is usuable within this period of time because no printing is possible. Thus, vector data may be converted into dot data during the idle time.

When data has been received from the host, a check is made to see if the received data is character code (111), as illustrated in FIG. 3.

If the received data is a character code, the process of changing priority levels is performed with reference to character codes which are stored in the non-volatile memory 4, as pre-processing for erasing a character of the lowest priority level when the cache memory has no empty area, and the character codes are stored in the non-volatile memory 4 again in correspondence with the priority levels (112). The next step (113) checks to see if the dot data corresponding to the character code received from the host computer 11 is held in the cache memory, and if it is, the dot data is stored in the bit map memory 5 (119). Thus, the process of converting the vector data into dot data can be omitted, so that the processing of the received data can be ended in a short time.

When the character code is not held in the cache memory and must be fetched from the vector font memory 2 (114), it is converted into dot data in accordance with the algorithim stored in the program ROM 7 (115). Subsequently, a check is made to see if there is an empty area in the cache memory, and the dot data then is stored in the cache memory 3 (118). In the absence of an empty area, the code data of the non-volatile memory 4 is examined, dot data of the lowest priority level is erased (117), and the dot data obtained by the conversion is stored in the cache memory 3 (119). By repeating the above processing steps, dot data items corresponding to character codes of higher priority levels are stored in the cache memory 3. In addition, the code data items of characters are stored in the non-volatile memory 4 in correspondence with the priority levels.

Referring now to the entry part of the flow chart in FIG. 3, when the data received from the host computer 11 is not a character code, the first check is to see if it is a print start request code (120). If it is a print start request code, a print start instruction is output to the printer engine 12 through the engine interface 6 (121). Then, there is a delay until the printer engine 12 becomes capable of starting printing (122), and when printing becomes possible, a data transfer start instruction is given to the DMA controller 13 (123). The DMA controller 13 transfers the dot data stored in the bit map memory 5 to the printer engine 12 through the engine interface 6 in time with a synchronizing signal delivered from the printer engine 12, so that printing occurs.

When the data received from the host computer 11 is not a print start request code, the processing of any other code, such as processing of the received data, terminates.

According to the present invention, even when dot data stored in a cache memory is destroyed due to cutoff of the power or for any other reason, data corresponding to the dot data previously stored in the cache memory is held in a non-volatile memory, and when a character to be printed does not exist in the cache memory, the data stored in the non-volatile memory is restored (regenerated) in the cache memory as dot data. By utilizing the dot data restored in the cache memory, the character generating time can be shortened as compared with the case where, after the power source is reconnected, the dot data of a character is converted from vector data and then stored in the cache memory anew each time the character is printed.

In addition, the data to be stored in the non-volatile memory may be set as code data, so that the memory capacity of the non-volatile memory can be made smaller than if dot data is stored therein.

The data items corresponding to the characters to-be-printed may be stored in the non-volatile memory with priority levels given thereto, and the data items stored in the non-volatile memory are restored in the cache memory as dot data in accordance with the priority levels by the use of output signals of such decision means. Therefore, the character generating time can be shortened as compared with the case where no priority level is given.

Moreover, of the data items to be stored in the non-volatile memory, the data of high priority level may be set as the dot data, and the data of low priority level set as code data, so that the character generating time can be shortened further.

The data corresponding to the character to-be-printed is stored in the non-volatile memory in advance, and the data stored in the non-volatile memory is restored in the cache memory as dot data after the power source is re-connected and before the output unit becomes capable of starting printing, so that when an output unit starts the printing, the same character generating speed as at the time of the cutoff of the power source may be established.

The non-volatile memory may be detachable, so that the data to be restored in the cache memory can be selected from data suitable for character generation, and the character generating time can be shortened to that extent.

The data items corresponding to the characters to-be-printed may be stored in the non-volatile memory with a user code affixed thereto, and the data items stored in the non-volatile memory then are restored in the cache memory as dot data in correspondence with the user code by the use of the output signals of suitable decision means, whereby even when the tendency of characters for use has changed due with the change of users, suitable characters can be generated, and hence, the character generating time can be minimised.

According to the character generating system and the character generating method of the present invention, the period of time for character generation can be shortened, and the memory capacity of the non-volatile memory may be small.

What is claimed is:

1. A character generating system for driving a printer engine to print characters on instruction from a host computer, comprising:

vector memory means for storing vector data representing characters to be generated;

volatile memory means for storing dot data representing at least some of said characters;

character generator means for generating characters corresponding to said dot data;

non-volatile write-enable memory means for storing all of character code and font type information corresponding to said dot data according to a priority level within the capacity of said non-volatile write enable memory means;

detecting means for detecting if code data has been received from said host computer and if said volatile memory means has been erased; and dot data regenerating for regenerating said dot data using said character code and font type information in said non-volatile write enable memory means and said vector data in said vector memory means when said code data is absent from said host computer and said volatile memory means has been erased, and for storing said regenerated dot data in said volatile memory means.

2. A character generating system according to claim 1, wherein said priority level is based on a most recently used order.

3. A method of printing characters on instruction from a post computer, said method comprising the steps of:

storing vector data in a vector memory, said vector data representing characters to be printed;

storing in a volatile memory dot data representing at least some kind of characters to be printed;

storing in a non-volatile write enable memory all of character code and font type information representing said dot data according to a priority level within the capacity of said non-volatile write enable memory;

detecting whether code data has been received from said host computer and whether said volatile memory has been erased;

regenerating said dot data using said character code and font type information in said non-volatile write enable memory and said vector data in said vector memory when said code data is absent from said host computer and said volatile memory has been erased; and regenerating and storing said regenerated dot data in said volatile memory.

4. A method of printing characters according to claim 3, wherein said priority level is based on a most recently used order.

5. A character generating system for driving a printer engine to print characters based on an instruction from a host computer, comprising:

a vector memory which stores vector data representing characters to be generated;

a volatile memory which stores dot data representing at least some of said characters to be generated;

a character generator which generates characters corresponding to said dot data;

a non-volatile write enable memory which stores all of character code and font type information corresponding to said dot data according to a priority level within the capacity of said non-volatile write enable memory;

a detector which detects whether code data has been received from said host computer and whether said volatile memory has been erased; and a dot data regenerator for regenerating said dot data using said character code and font type information in said non-volatile write enable memory and said vector data in said vector memory when said code data is absent from said host computer and said volatile memory has been erased, and which stores said regenerated dot data in said volatile memory.

6. A character generating system according to claim 5, wherein said priority level is based upon a most recently used order.

* * * * *